UNITED STATES PATENT OFFICE.

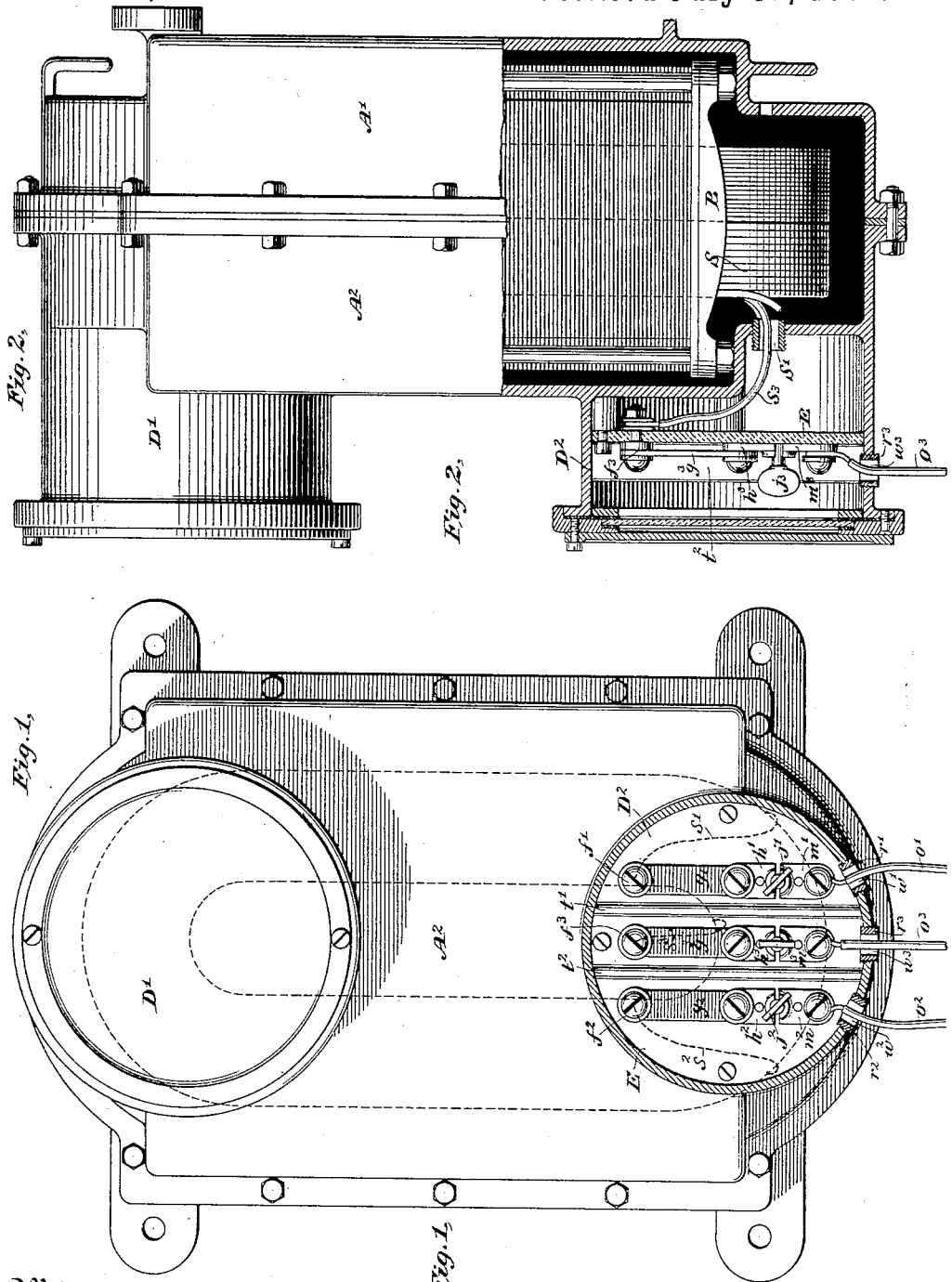

OLIVER B. SHALLENBERGER, OF ROCHESTER, AND HENRY M. BYLLESBY, OF PITTSBURG, ASSIGNORS TO THE WESTINGHOUSE ELECTRIC COMPANY, OF PITTSBURG, PENNSYLVANIA.

ELECTRIC CONVERTER.

SPECIFICATION forming part of Letters Patent No. 387,013, dated July 31, 1888.

Application filed September 1, 1887. Serial No. 248,431. (No model.)

*To all whom it may concern:*

Be it known that we, OLIVER B. SHALLENBERGER and HENRY M. BYLLESBY, citizens of the United States, residing, respectively, in Rochester, in the county of Beaver, and Pittsburg, in the county of Allegheny, both in the State of Pennsylvania, have invented certain new and useful Improvements in Electric Converters, of which the following is a specification.

The invention relates to the construction of boxes for containing electric converters, and to the means provided for securing electric connections with the converters placed therein.

The invention consists, in general terms, in organizing the parts in the following manner: The main portion of the converter-box is preferably constructed in two parts, one of which is designed to be secured to suitable supports, while the other is formed with compartments for receiving the terminals of the primary and secondary coils of the converter. These compartments contain suitable circuit-controlling devices mounted upon plates of non-conducting material. The plates are formed in this instance of glass or other vitreous material, and one of them is provided with three binding-screws or posts for receiving the respective ends of a coil, and a third conductor leading from a point intermediate in the length of the coil. The respective binding-screws are connected through fusible strips with coupling devices, whereby they may be connected with other binding-posts receiving the outside conductors, which are designed to be connected with the translating devices or other apparatus. Between the sets of binding-posts there extend lugs formed upon the non-conducting plate, and these serve to prevent accidental electrical connections between them.

In the accompanying drawings, Figure 1 is a front view, partly in section, of a converter-box; and Fig. 2 is a side elevation, also partly in section.

Referring to the figures, A' represents the rear section and A² the front section of the box, and B the converter placed therein. The section A' is designed to be supported in any convenient manner. The front section, A², is bolted or otherwise securely fastened to the section A'. The section A² carries two compartments, D' and D², formed by annular webs thrown out from the casting. The compartment D' is designed in this instance to receive the terminals of the primary conductor. The terminals of the secondary coil S of the converter are led through openings S' into the compartment D². This compartment is provided with a non-conducting plate, E, which is preferably of glass. The terminals $s'$ and $s^2$ of the secondary coil are connected with binding-screws $f'$ and $f^2$, respectively, which pass through the plate. A third conductor, $s^3$, leading from a central point in the length of the secondary conductor S, is connected with a third binding-post, $f^3$, which is preferably between the binding-posts $f'$ and $f^2$.

The posts $f'$, $f^2$, and $f^3$ are respectively connected by means of fusible strips $g'$, $g^2$, and $g^3$ with three binding-posts or switch-plates, $h'$, $h^2$, and $h^3$. These switch plates are respectively provided with contact-plates $m'$, $m^2$, and $m^3$, with which they may be connected by corresponding switch-plugs, $j'$, $j^2$, and $j^3$. Conductors $o'$, $o^2$, and $o^3$ are led from the respective plates $m'$, $m^2$, and $m^3$ through suitable openings, $w'$, $w^2$, and $w^3$, which are lined by thimbles $r'$, $r^2$, and $r^3$, of non-conducting material.

Between the strips $g'$ and $g^3$ and the corresponding binding-posts and switch-plates there extends a lug, $t'$, and between the strips $g^3$ and $g^2$ a similar lug, $t^2$. These lugs serve to securely separate the conductors from each other and prevent accidental short circuits from being formed. The lugs are preferably integral with the plate itself. The several plates are here shown with their switch-plugs $j'$ $j^2$ $j^3$ inserted; but it will be understood that the connections may be made and interrupted as desired, so that the connections may be made with a portion of or with the entire secondary coil as desired for different purposes. The plate is useful, also, in connection with single-coil converters, and it may be used in connection with the primary coils.

We claim as our invention—

1. The combination, with a box for receiving an electric converter, of a compartment receiving the terminals of a coil thereof, a non-conducting plate within such compartment, three binding-posts for receiving conductors leading respectively from the terminals and an intermediate point in the length of a coil of the converter, binding-posts for receiving the terminals of the outside conductors, fusible strips and circuit-controlling devices applied thereto, and lugs of non-conducting material formed upon said plate, separating the different sets of binding-posts, substantially as described.

2. In a converter-box, a plate for receiving the terminals of the converter-coil, formed of vitreous material, three binding-posts carried thereby, fusible strips respectively connected at one end with said binding-posts, switch-plugs receiving the remaining ends, respectively, means for placing electric conductors in connection with said switch-plates, and lugs upon the plate integral therewith intervening between the fusible strips and their respective binding-posts and switch plates, substantially as described.

In testimony whereof we have hereunto subscribed our names this 1st day of July, A. D. 1887.

OLIVER B. SHALLENBERGER.
HENRY M. BYLLESBY.

Witnesses:
W. D. UPTEGRAFF,
CHARLES A. TERRY.